Feb. 7, 1950　　　C. W. CLUTZ ET AL　　　2,496,936
SCALE ENGRAVING AND NUMBERING APPARATUS

Filed May 5, 1945　　　　　　　　　　　　　4 Sheets-Sheet 1

CHARLES W. CLUTZ
EARLE A. YOUNG
INVENTOR

BY
ATTORNEYS

Feb. 7, 1950 C. W. CLUTZ ET AL 2,496,936
SCALE ENGRAVING AND NUMBERING APPARATUS
Filed May 5, 1945 4 Sheets-Sheet 2

CHARLES W. CLUTZ
EARLE A. YOUNG
INVENTORS

BY
ATTORNEYS

Feb. 7, 1950 — C. W. CLUTZ ET AL — 2,496,936
SCALE ENGRAVING AND NUMBERING APPARATUS
Filed May 5, 1945 — 4 Sheets-Sheet 4

CHARLES W. CLUTZ
EARLE A. YOUNG
INVENTORS

ATTORNEYS

Patented Feb. 7, 1950

2,496,936

UNITED STATES PATENT OFFICE 2,496,936

SCALE ENGRAVING AND NUMBERING APPARATUS

Charles W. Clutz and Earle A. Young, Rochester, N. Y., assignors to Eastman Kodak Company, Rochester, N. Y., a corporation of New Jersey Application May 5, 1945, Serial No. 592,174

14 Claims. (Cl. 33—19)

The present invention relates to an engraving machine for cutting and numbering the divisions of a scale for a range finder, or like instrument, and particularly to a machine of this type which is automatic in operation and is capable of very precise work.

The engraving of scales used on instruments such as range finders, and the like, is a very delicate and precise operation which has presented quite a problem to the manufacturers of these instruments. The usual procedure for making such scales has involved the use of a pantograph apparatus wherewith the operator traces over a many-times enlarged master scale and the cutting knife is in turn moved over the scale blank through a proper reducing linkage. Not only has this procedure been extremely slow and subject to the human element, but it has proved impractical, if not impossible, due to wear and manufacturing tolerances, to insure the cutter being moved over the desired path with the desired reduction of movement in response to the tracing pointer of the pantograph arrangement.

One object of the present invention is to provide a scale engraving machine which is completely automatic in operation.

Another object is to provide a scale engraving machine which is capable of cutting a scale whose graduations are exceedingly close together and of varying and/or equal distances apart; and a machine that is capable of cutting such a scale so accurately that when the blank is run through the engraving operation the second time that the originally cut lines will not be widened.

And another object is to provide an apparatus of the type set forth which is capable of extreme accuracy although no unusual mechanical accuracy of machined interengaging parts is required.

Still another object is to provide a scale engraving machine in which the scale blanks are intermittently fed longitudinally by a screw driven by an electric motor in accordance with the spacing desired between the scale lines and the cutters are moved transversely of the direction of feed when the blank is stationary.

And yet another object is to provide an engraving machine in which the master scale is scanned by a scanning system including a light-sensitive cell which in turn forms a part of the motor control circuit to stop the blank feeding motor when a line on the master scale has been advanced into the scanning beam.

And another object is to provide a motor circuit which causes the cutter motor to start automatically when the feed motor stops in order to cut a line, and by virtue of which the feed motor is again automatically started when the cutter has completed one cutting cycle even though the previous line on the master scale is still in the scanning beam. After the line on the master scale is once moved from the scanning beam, the control circuit is immediately reset so that the scanning system assumes complete control of the feeding motor.

Another object is to provide a motor control circuit by virtue of which direct current is instantly applied to the blank feeding motor when it is cut off and alternating current is applied to the cutter motor, and vice versa, so that a dynamic brake is applied to the blank feeding mechanism and cutter feeding mechanism to prevent over-travel thereof from a preselected position.

A further object is to provide a motor control circuit which prevents the blank feeding motor from being driven so long as the cutters are in any other than a neutral position.

Another object is to provide a scale engraving apparatus of the type set forth in which the scanning system and the stroke of the cutter is adjustable for cutting scale lines of different lengths.

And still a further object is to provide an apparatus of the type set forth wherein after the scale blank has been fed its full length a limit switch is tripped which paralyzes the motor circuit and the blank carrying table can be disconnected from the feeding screw and can be manually returned to its starting position. A scale cutting operation cannot be resumed until the manual control switch is returned to its "neutral" position and again returned to its "automatic" position.

The novel features that we consider characteristic of our invention are set forth with particularity in the appended claims. The invention itself, however, both as to its organization and its methods of operation, together with additional objects and advantages thereof, will best be understood from the following description of the specific embodiments when read in connection with the accompanying drawings in which.

Like reference characters refer to corresponding parts throughout the drawings.

Figure 12:
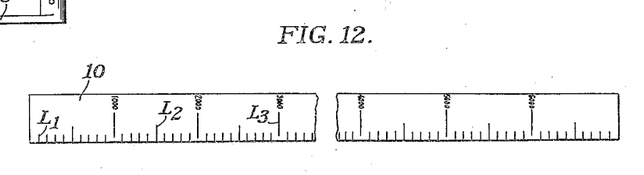
Fig. 12 is an enlarged plan view of the type of scale which might be engraved by the apparatus.

The particular embodiment of the present invention disclosed was designed to engrave the range division and numbers on the ivory range scale used on a particular type of range finder which requires engraving on both sides, and since the two sides are mirror images of each other, opposite sides of two scales are cut at the same time. Fig. 12 shows a typical type of scale which this apparatus is adapted to engrave and number, although for purposes of clarity the spacings between the individual lines have been illustrated as equal rather than logarithmic or semi-logarithmic as is actually the case. So far as an understanding of the present invention is concerned, it is primarily of interest that the scale comprises a blank 10, composed of ivory or other suitable material, having lines of three different lengths, $L_1$, $L_2$, and $L_3$ engraved thereon in spaced relation longitudinally of the scale.

To facilitate an understanding of the machine, a brief description of its operation will now be outlined.

There are two main parts to the operation of the machine; first, engraving the lines, and second, stamping the numbers. The lines are drawn in with knives in a completely automatic cycle. There are three different lengths of lines on the scale making it necessary to pass through the cutting cycle three times, once for each length of line. The position of the scanning beam and the length of the stroke of the cutter is changed ahead of each cycle.

A pair of scale blanks 10 are glued into or onto a platen, side by side, with a given distance, e. g. ⅝", between them. Then the top surface of the blanks are milled flat and polished with a suitable abrasive.

The platen is screwed down onto a carriage which travels along lengthwise of the scale on a ball track. This table is driven by a condenser-start, condenser-run induction motor through a reduction gearing and screw thread. The cutters are driven by a second condenser-start, condenser-run induction motor through a reduction gearing, adjustable eccentric, crank, and slide.

These two motors are run with alternating current and dynamically braked with direct current. One motor is always connected to alternating current while the other is connected with direct current. Relays are used to transfer the alternating current and direct current supplies back and forth between the two motors. These relays are actuated by a standard photo-electric relay unit.

The photo-electric actuation is obtained by scanning an aluminized glass master scale which is fastened to the side of the carriage. It is engraved with .003 inch wide slits through the aluminum coating. These are accurately spaced along the length of the glass and are in three rows to correspond to the long, medium, and short lines on the scale. A suitable condenser system projects a beam of light .001 inch wide onto the aluminum surface of the glass master scale. When it comes to the leading edge of a slit, a light-sensitive cell under the scale receives an impulse of light. This actuates an electronic or photo-electric relay, which in turn actuates another relay, throwing alternating current off of the carriage driving motor and onto the cutter driving motor. At the same time, it is throwing the direct current from the cutter driving motor to the table-driving motor.

This causes the carriage to stop and the cutter to travel through a single turn of the eccentric cutting a line in each scale blank. A microswitch is closed at the end of this time actuating the A. C.-D. C. control relay. This stops the cutter motor and starts the carriage motor. This cycle of events is repeated until all of the lines of one length are cut on the blank. Then the lateral position of the scanning beam is shifted and the stroke of the cutters is changed to run through twice more for the other two lengths of lines desired on the blank. The numbers are then pressed in by running the table manually under a set of embossed steel roll stamps.

Referring now to the drawings, a specific description of the apparatus designed to carry out the above set forth operation will now be described. Referring to Figs. 1, 2, 3, and 6, the apparatus comprises a stationary bed plate 11, which is adapted to rest on the top of a bench, and on the top of which are mounted a pair of condenser-start, condenser-run induction motors $M_f$ and $M_c$, the former causing the feed of the scale blanks and the latter driving the scale cutter. The top of the bed plate is provided with three grooves running lengthwise thereof, see Fig. 3, the two outside ones 12 forming seats for a plurality of ball bearings 13 held in spaced relation along the grooves by ball retainers 14. The center V-groove 15 accommodates a feed screw 16 which is journaled on the bed plate and is connected to a reduction gear box 17 of the motor $M_f$ through a pinion and gear combine 18.

Figures 4, 5, 6, 7, 8, 9:
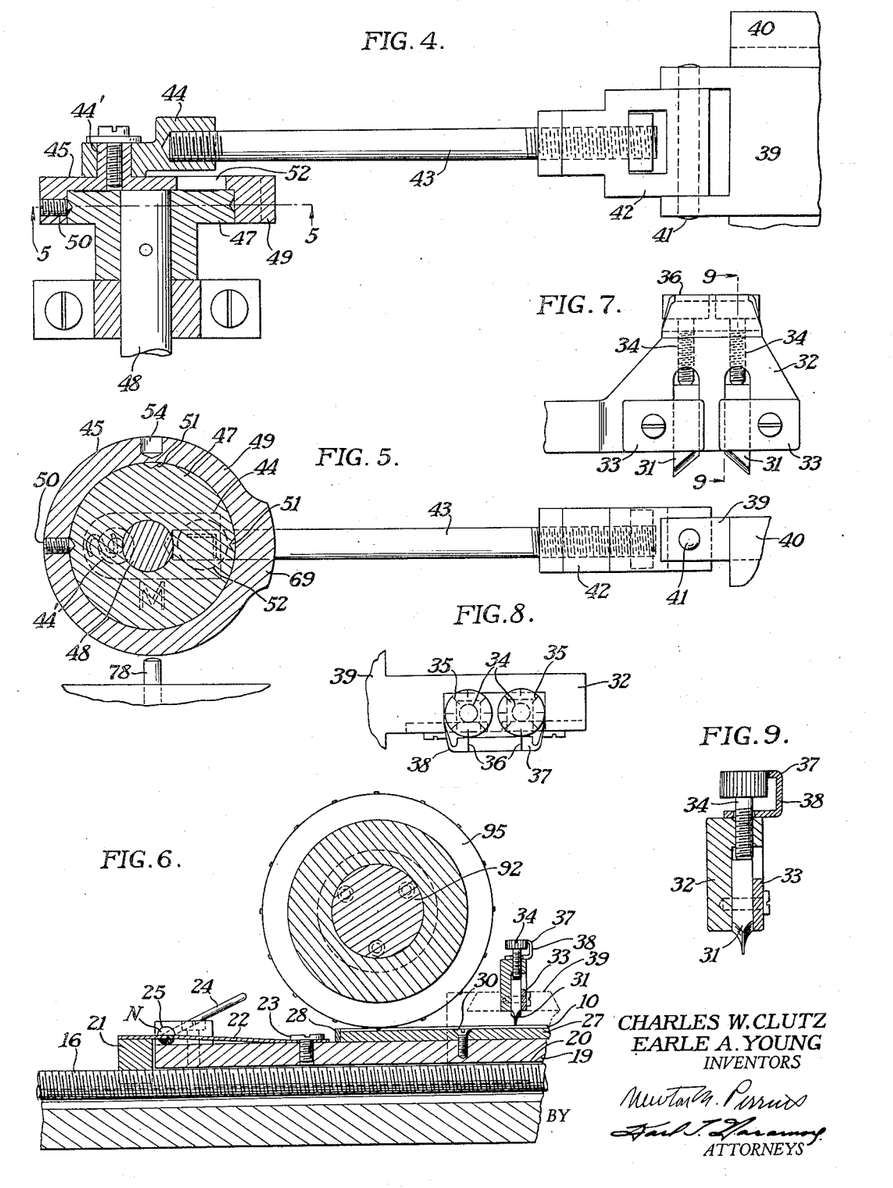
Fig. 4 is an enlarged top view, partly in section, of the crank drive for the cutter, and particularly showing the adjustable eccentric for varying the stroke of the cutter.
Fig. 5 is a vertical sectional view taken substantially on lines 5—5 of Fig. 4.
Fig. 6 is a vertical section taken substantially on lines 6—6 of Fig. 3.
Fig. 7 is an enlarged detail showing the manner of adjustably mounting two cutters in the end of the cutter arm.
Fig. 8 is a top plan view of Fig. 7 showing how the vertical position of the cutters can be accurately adjusted to control the depth of the cut made thereby.
Fig. 9 is a section taken substantially on lines 9—9 of Fig. 7.

A carriage 19 in the form of a plate having grooves in its under surface is mounted on the ball-bearings to move along the bed plate, and the under side of this carriage is provided with a groove 20 to accommodate the feed screw 16. As shown in Fig. 6, the carriage is adapted to be releasably connected to the feed screw 16 by means of a semi-circular nut 21 which is connected to one end of the plate by a spring strip 22 which is in turn fastened to the top of the carriage by a bolt 23. The spring strip 22 normally forces the nut 21 downwardly into engagement with the feed screw, the position shown in Fig. 6, so that the carriage will be slowly moved along by this screw-threaded engagement. When it is desired to disengage the carriage from the feed screw it is only necessary to swing the release lever 24 from the position shown in Fig. 6 counterclockwise. As clearly shown in Figs. 1 and 6, this release lever is connected to a rod 25 journaled at opposite ends on the bed plate and having its intermediate portion milled away to provide a notch N into which the strip 22 is adapted to drop when the nut is in engagement with the feed screw. Turning the release lever 24 counterclockwise causes the strip to be moved upon the normal diameter of the rod 25 whereupon the nut is disengaged from the feed screw. This disengagement is normally affected at the end of each travel of the carriage so that it can be returned to its starting position by hand, as will be hereinafter explained.

The two scale blanks 10 which are to be engraved are mounted on opposite sides of a groove 26 provided in the top of a platen 27. The base of the groove in this platen is finished optically flat and the blanks are located therein with one edge abutting one wall of the groove and with one end flush with a stop 28 located at one end of the platen, see Figs. 1, 3 and 6. After the blanks are properly positioned and cemented on the platen, the top of the blanks are milled off and polished as above set forth. The loaded platen is then fixed to the carriage in a given position by a plurality of bolts 30 which pass through holes in the platen and into threaded engagement with tapped openings in the top of the carriage. This locates the blanks in a given position with relation to the cutter path and a master scale so that the displacement of the lines engraved on the blanks will correspond precisely with those on the master scale both in number and type.

The scale cutters comprise two knives 31 whose cutting edge is sharpened to make a scale mark of the desired width, e. g. .003", in a single cutting stroke. These two knives are individually clamped to a cutter head 32 by a pair of clamping plates 33 so that their cutting edges are in alignment. The depth of cut made by the knives can be individually adjusted by screws 34 which are threaded through the top of the cutter head and bear on the square top end of the knives, see Figs. 5-9. To aid in adjusting the depth of cut made by the knives, and to make them both the same, the tops of the adjusting screws 34 are provided with identical scales 35 which cooperate with index marks 36 on the turned over edge 37 of an index carrier 38, carried by the cutter head and common to both screws.

The cutter head and knives are adapted to be moved at right angles to the direction of feed of the carrier by a motor driven crank mechanism now to be described. The cutter head has extending therefrom a slider block 39 which cooperates with a V-grooved slideway 40 mounted on the bed plate, see Fig. 6. This slide and slideway construction insures the cutter head moving in a given direction and being maintained at the proper level above the blanks. The end of the slide block 39 is in the form of a yoke and is pivotally connected at 41 to a turn-buckle 42 into which is threaded a connecting rod 43 which extends into a socket member 44 rotatably mounted on a post 44′ eccentrically mounted on an adjustable crank 45 driven by the motor Mc thru a gear reduction box 46. It will thus be seen that when the cutter driving motor Mc makes one revolution the knives are driven by the crank mechanism through a single cycle. If the neutral position of the knives is between the blanks, as it is, see Fig. 3, then during one cycle of the cutter head one of the knives will make a line on one of the blanks and the other knife will make a line of equal length on the other blank and in alignment with the line made in the first blank by the first knife.

So that the crank mechanism can be adjusted to cut lines of three different lengths, the crank 45 is made adjustable as to throw. According to the present invention this is done by making the crank up of an eccentric male member 47 pinned to the motor-driven shaft 48 and in engagement with a female member 49 in the form of a cup which seats said male member, see Figs. 4 and 5. The female and male members are connected together by a setscrew 50 in the female member adapted to enter recesses 51 spaced about the periphery of the male member. By turning the female member relative to the male member the eccentricity of the crank mechanism can be adjusted to give the stroke desired. In the present instance, since three different lengths of lines are desired, the male member is provided with three notches which when alternately located with the set-screw will give the crank throws desired. The face of the male member is provided with markings "S" "M" and "L" designating short, medium and long lines to be engraved; and the marking for which the crank is adjusted is visible through a hole 52 in the web of the female member so that the operator can be sure for what length of line the crank is adjusted.

To facilitate adjustment of the crank a spring-retractable pin 53 mounted on the bed plate adjacent the crank can be pressed into a hole 54 in the periphery of the female member to lock the same while the male member is rotated relative thereto by turning the motor by hand by means of hand wheel 55 fixed thereto. The locking pin 53 is held in by a bayonet lock arrangement 56, and is automatically retracted by the spring when released. At the completion of one cycle of the crank 45, or after a line on each scale blank has been engraved, the feed motor Mf must be started despite the fact that the last line on the master scale is still in the light beam of the scanning system, and at the same time alternating current must be cut off from the cutter driving motor Mc and direct current applied thereto to dynamically brake the same with the cutters in their neutral position. This is accomplished by a cam portion 69 on the female member of the crank engaging and operating micro-switch 78 which is located on top of the bed plate beneath said crank.

The feeding movement of the carriage relative to the cutter path is controlled by a master scale and scanning system combination which will now be described. In Fig. 12 a master scale is shown which is used to control the engraving of the blanks mounted on the movable carriage. This scale comprises a transparent plate 57 having an opaque coating 58 on the top surface which is removed at intervals to provide transparent lines 59 which correspond in spacing to the lines desired on the blanks 10. We have found that a glass plate having an aluminum surface provides a master scale that can be readily made with sharp lines. It will be noticed that this master scale is provided with three series of lines $L_1'$, $L_2'$ and $L_3'$ spaced laterally from one another. The series of lines $L_1'$ are scanned first to control the cutting of the short line $L_1$ on the scale, then the series of lines $L_2'$ are scanned to control the cutting of the medium length lines $L_2$ and finally the series of lines $L_3'$ are scanned to control the cutting of the long lines $L_3$ of the scale. As pointed out above, the blanks are fed through the machine to cut all of short lines $L_1$, and are returned to their starting position and again fed through the machine to cut the medium length lines $L_2$, and finally they are fed through the third time to cut the long lines $L_3$. The stroke of the cutter head is properly adjusted between each complete feeding operation.

Figure 1:
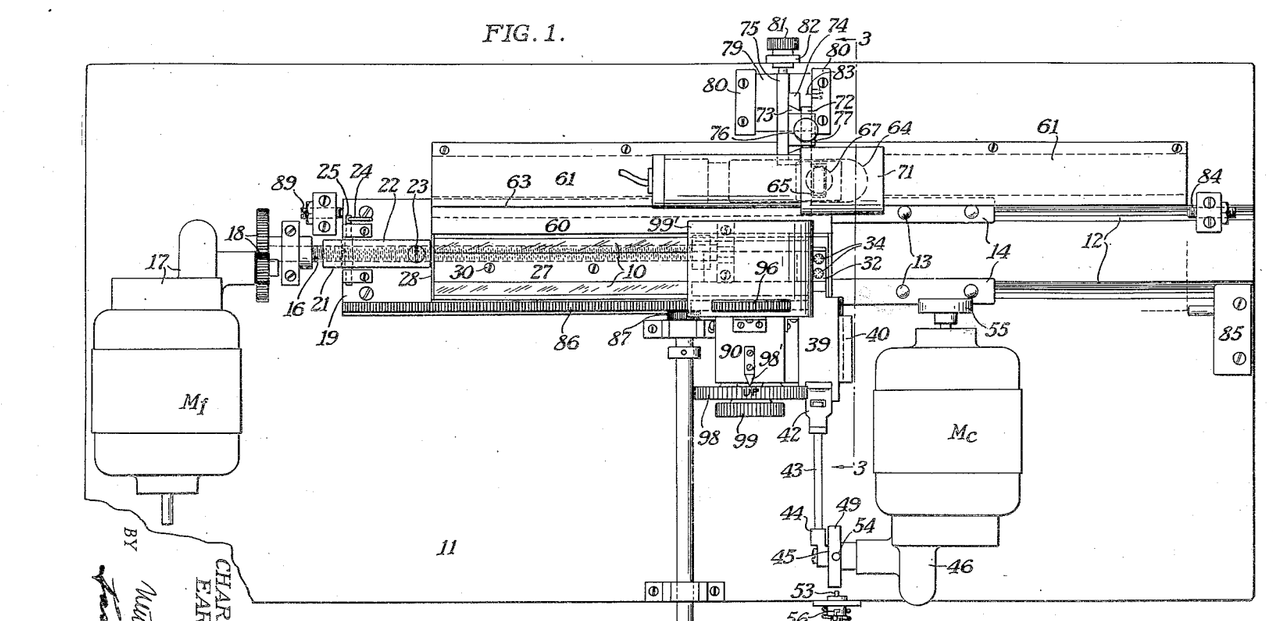
Fig. 1 is a top plan view of a scale engraving machine constructed in accordance with a preferred embodiment of the present invention.
Figure 2:
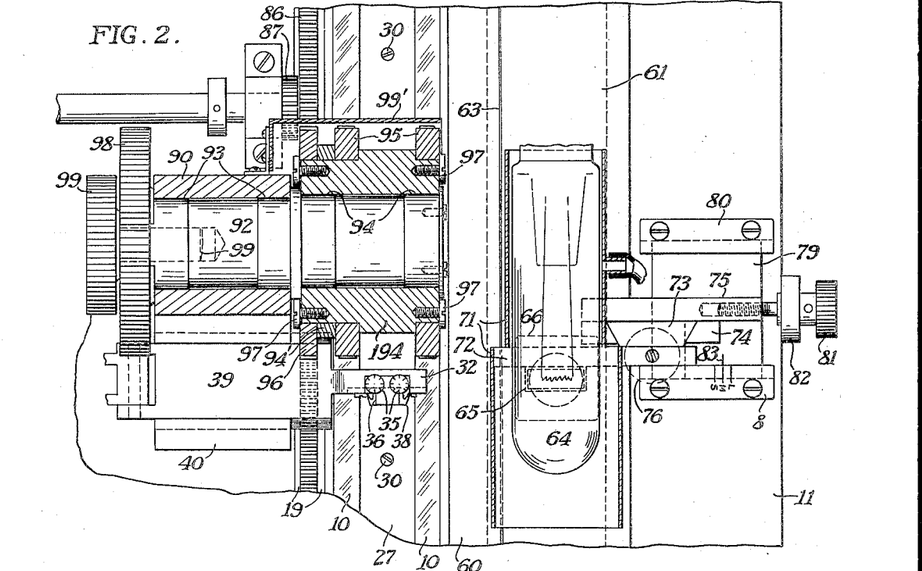
Fig. 2 is a partial sectional view taken substantially on lines 2—2 of Fig. 3.
Figure 3:
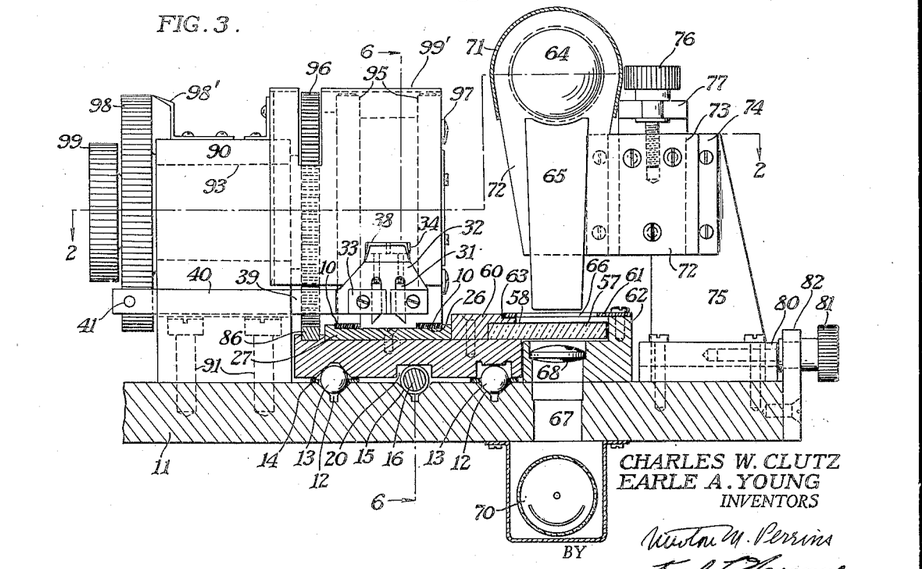
Fig. 3 is an enlarged sectional view taken substantially on lines 3—3 of Fig. 1.

As clearly shown in Figs. 1-3, the master scale 57 is clamped onto, in overhanging relation to one edge of, the top of the carriage 19 by an L-shaped clamping member 60 bolted to the carriage to move therewith. The master scale is definitely located with respect to the cutter path and the blank positioning means so that the scale engravings will appear in the proper location on the blanks. The master scale is covered by a plate 61 which is bolted along one edge to the top of a supporting block 62 fixed on the top of the bed plate 11, the free edge of this plate lying in a notch 63 in the edge of the clamping member 60 so that the top thereof is substantially flush with the top of said clamping member, see Fig. 3. The plate 61 protects the master scale against physical damage and prevents stray light from passing through the lines thereon.

The master scale 57 is adapted to be scanned by a scanning system including an exciter lamp 64 and a suitable condenser system (not shown) mounted in the rectangular housing 65 to project a beam of light .001 inch wide through a slit 66 in the cover plate 61 and onto the master scale. The scanning system also includes a bore 67 through the bed plate 11 below the slit 66 in the plate 61 in which there is located a field lens 68 for directing light passing through the scale lines on the master scale onto the light-sensitive cell 70. This light cell 70 is connected into the motor control circuit, to be later described, so that when the cell is dark the feed motor $M_f$ is energized to cause the carriage and scale blanks thereon to be advanced. Just as soon as the leading edge of a transparent line on the master scale comes into the light beam of the scanning system, light strikes the light cell 70 which in turn causes the alternating current to be cut off from the motor $M_f$ and direct current to be applied to the field windings thereof. Thus the carriage driving means is dynamically braked with the line on the master scale in the light beam, and at the same time the alternating current is applied to the cutter driving motor $M_c$ to instigate the engraving operation of a single line on each of the blanks 10.

The complete optical system of the scanning system may be any one of several conventional types used in sound reproduction or recording systems, e. g. one of those shown in U. S. Patent 2,161,368, McLeod, June 6, 1939, so that it is not deemed necessary to show it in detail herein. The exciter lamp is shielded by a hood 71 which serves both to direct the light into the optical system carried in the housing 65 and to prevent stray light from passing to other parts of the apparatus. In order for the scanning system to most accurately scan the master scale and render the apparatus most responsive, the light beam must be focused accurately on the top of the master scale. To provide for such focusing adjustment, the exciter lamp 64, its shield 71 and the housing 65 for the optical system are mounted on a block 72 which is rendered vertically adjustable by having a V-slide 73 carried thereby mounted in a complementary slideway 74 fixed to a bracket 75 adjustably supported on the bed plate 11. An adjusting screw 76 rotatably mounted in an arm 77 of the bracket 75 is in threaded engagement with the slide 73 so that by rotation thereof the exciter lamp and the projection system therefor can be readily adjusted toward and away from the master scale.

Because of the position of the light-sensitive cell in the disclosed design, visual focus of the optical system for proper illumination of the master scale is somewhat awkward. However, focusing can be done electronically with the same or better accuracy and without disturbing the photo-cell mounting. This method of focusing will be fully set forth below after the motor circuit is described because it involves the use of certain parts making up a part of said circuit.

To permit lateral adjustment of the scanning system for individually scanning the three different series of lines $L_1'$, $L_2'$ and $L_3'$ on the master scale, the supporting bracket 75 includes a V-slide block 79 which engages a slideway 80 fixed to the top of the bed plate 11. Accordingly, the bracket 75 and the scanning system carried thereby is adjusted laterally of the master scale by turning adjusting screw 81 rotatably mounted in a plate 82, fixed to the edge of the bed plate 11 and extending thereabove, said screw being in threaded engagement with the slide block, see Figs. 2 and 3. The three different lateral positions of the scanning system desired are indicated by the co-operation between an index 83 carried by a slide block and a scale marked "S," "M" and "L" carried by the slideway, the designations "S," "M" and "L" indicating the proper positions of the scanning system for scanning the three different series of lines $L_1'$, $L_2'$ and $L_3'$ on the master scale, and which control the generation of the short, medium and long lines desired on the finished scale. It will be appreciated that the length of the light beam projected onto the master scale is limited so that it can be selectively directed through alternate ones of the three series of lines on the master scale without passing through those of a laterally adjacent series.

After the blanks have been fed through one complete feeding operation to cut one series of lines on the blanks 10 the end of the carriage 19 simultaneously strikes an adjustable stop 84 on the end of the bed plate 11 and an overtravel switch 85 to open the same. Opening of the switch 85 stops the feed motor $M_f$ and turns out the exciter lamp. The carriage can then be manually returned to the starting point without actuating the photoelectric relay and with the feed motor still dead. Manual control of the carriage movement comprises a rack 86 mounted along one edge thereof into engagement with which a pinion 87 controlled by a crank 88 can be moved by sliding the crank and pinion axially. When the apparatus is set for automatic operation, the crank and pinion are moved to the retracted position shown in Fig. 1 so that the pinion is disengaged from the rack. When the carriage is returned to its starting position the left end of the carriage (referring to Fig. 1) engages an adjustable stop 89.

Figure 10:
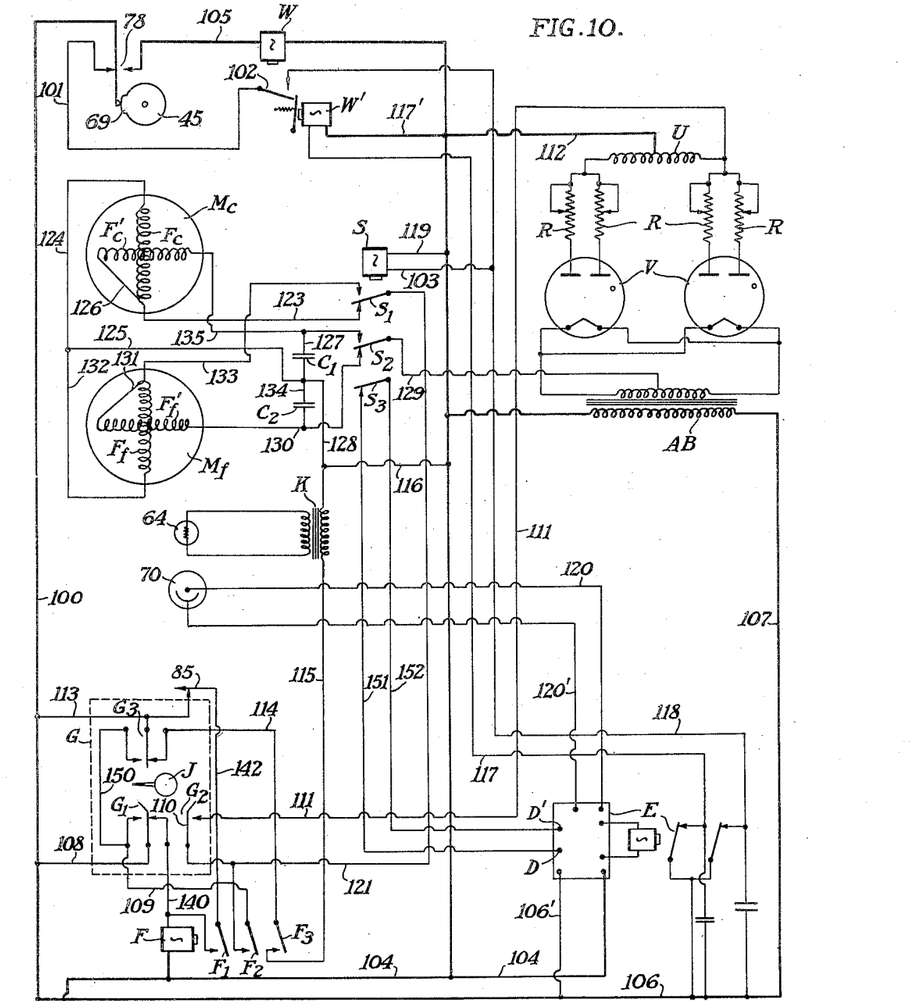
Fig. 10 is a schematic wiring diagram of the motor control circuit of the apparatus.

Referring now to Fig. 10 the control circuit for the present scale engraving machine will be described. The motor control circuit as a whole is adapted to be connected to a source of alternating current when switch C is closed. With this switch closed, power is adapted to be fed over line 100, through switch 78, either through line 101 and switch 102 to line 103 and thence through the coil of relay S and back to the main return line 104 through line 119 or through line 105 to the pull-up coil W of a latching relay and back to return line 104, depending upon the position of switches 78 and 102.

Power is also adapted to be fed over lines 106 and 107 to the filament transformer AB and to the return line 104. This filament transformer AB provides a part of a rectifying system which is used to supply direct current power for dynamically braking the respective motors in turn, although it will be appreciated that any suitable separate source of direct current supply could be provided for this purpose as desired. The rectifying system shown includes two full-wave, mercury-vapor rectifier tubes V (type 83 tubes) whose filaments are connected in parallel to the center-tapped secondary of the filament transformer AB. While each of these tubes is normally a full wave rectifier, it will be noticed that the two plates of each rectifier tube are connected together through the variable resistance R to the same terminal of the plate transformer U which is shown as an auto transformer. Each tube is thus used as a half-wave rectifier in a full-wave system. This arrangement is used to obtain the required current capacity for the dynamic braking circuit without exceeding a reasonable load for the type 83 tubes. Variable resistances R are connected in series with each plate so that the current distribution between the plates of the respective tubes can be equalized.

Figure 10A:
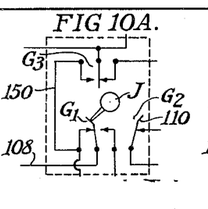
Fig. 10A is a schematic detail of the manual control switch in the motor circuit, and showing the position that the component switches thereof assume when the control knob thereof is turned to the "automatic" or "run" position.

Power is adapted to be supplied to the plate transformer U of the rectifying system thru feed lines 100, 108, 109, 110, and 111 controlled by the component switch G₁ of the main two-way lever composite switch G, switch F₂ of relay F and component switch G₂ of switch G. The current passing through the plate transformer passes to the main return line 104 through line 112. The two-way lever switch G includes three separate component switches G₁, G₂ and G₃ which are controlled by a control knob J having three different positions; and the switch as a whole is indicated by a dotted line box in Fig. 10 as enclosing these three component switches. When the knob J of switch G is in neutral position, shown in Fig. 10, the three switches G₁, G₂ and G₃ assume the positions shown in Fig. 10. When the control knob J is turned counter-clockwise to its "automatic or run" position, the three switches G₁, G₂ and G₃ assume the positions shown in Fig. 10A. When the control knob J is turned clockwise from its neutral position to its so-called "manual" position, switches G₁, G₂ and G₃ assume the positions shown in Fig. 10B. Power is fed to the transformer K of the exciter lamp 64 through feed lines 100, 113, 114 and 115 which, respectively, include component switch G₃ of switch G which is normally in the position shown in Fig. 10, and switch F₃ of relay F. The current passing over these lines passes through the primary of transformer K to the main return line 104 through line 116.

Power is also fed over lines 106 and 117 to the latch release coil W' of the latching relay and then to the main return line 104 through line 117'. This feed is controlled by a photoelectric relay E. Power is also fed over lines 106, 118, and 103 to the coil of relay S, returning to the main return line 104 by way of line 119. This feed line is also controlled by photoelectric relay E. The photoelectric relay E is of a standard type obtainable from General Electric under the designation CR7505-N110-G2 115 v. 60 cycle, and need not be specifically disclosed except to say that it includes a double-pole switch which is opened when the relay coil is energized upon current passing to the relay through lines 120 and 120' when photo-cell 70 is illuminated. When the cell is dark, the relay is opened and the current can pass over lines 117 and 118 to the latch release coil W' of the latching relay and to the coil of relay S.

Power is also fed to switch S₁ of relay S through feed lines 100, 108, 109, and 121 controlled by the component switch G₁ of switch G and by switch F₂ or relay F. When the relay S is opened, the position shown in Fig. 1, then alternating current is able to pass through line 123, through winding Fc of motor Mc and, thence through lines 124, 125, 128 and 116 to the main return line 104. Alternating current is also able to pass through line 123 and branch 126 through winding Fc' of motor Mc and thence through lines 135, and 127 to condenser C₁. This circuit is completed to the main return line 104 through lines 128 and 116. Since alternating current is capable of passing through both windings of the condenser-start, condenser-run motor Mc this motor will drive to operate the cutter.

At the same time alternating current is applied to the cutter driving motor Mc by virtue of relay S being open, it will be seen that direct current from the rectifying system is fed through line 129, the switch S₂ of the relay S and line 130 to winding Ff' of feed motor Mf. After passing through winding Ff' and branch 131 the current has to pass through winding Ff and by lines 132, 125, 128, and 116 to the main return line 104, because line 133 is open at switch S₁ of relay S. Line 104 is also the return line for the direct current supply by virtue of line 112 to the center tap of auto transformer V and thus direct current is put through both of the windings of feed motor Mf and the feeding mechanism is dynamically braked.

If the relay S is energized, alternating current will pass through line 133 to the winding Ff of motor Mf and thence through lines 132, 125, 128, and 116 to the main return line 104. At the same time it will pass through branch 131, the second winding Ff', line 130, condenser C₂ and lines 134, 128, and 116 to the main return line 104 so that the condenser-start, condenser-run feed motor will now be driven. Inasmuch as relay S is closed, then direct current is fed through lines 129, 135, the winding Fc' of motor Mc branch 126, winding Fc and lines 124, 125, 128, and 116 to main return line 104, because line 123 is open at switch S₁ of relay S. Accordingly, direct current will be applied to the winding of the cutter driving motor Mc and the cutter mechanism will be dynamically braked.

Now that several possible paths of current to the different parts of the circuit and their control by the relays have been specifically set forth, a complete cycle of operation of the circuit can be readily understood. In Fig. 10 the parts of the circuit are in the position they normally assume when the cutter has just finished a cutting stroke and the photo-cell is dark. In other words, the circuit is in a condition for starting the engraving operation of a new scale.

The first step is to close the main switch C.

This allows current to flow through line 100, 108, switch G1, and line 140 to energize and close relay F and return to the main line by way of main return line 104. The closing of relay F allows current to pass to the coil thereof through lines 100, 113, over-travel switch 85, line 142, and switch F1 of relay F to the coil of the relay F. At the same time, current passes through lines 100, 113, switch G3, line 114, switch F3 of relay F to the primary of transformer K and thence through line 116 back to the main return line 104. Thus energized, transformer K operates the exciter lamp 64. Also at the same time, current passes through lines 106 and 107, through the primary of transformer AB and back to the main return line 104. Thus energized transformer AB heats the filaments of the tubes in the rectifier system. Also at the same time, current passes through lines 106, 106' and through the photoelectric relay and back to the main return line 104. The photoelectric relay unit is thus energized. Also at the same time, since the photoelectric cell is dark, current will pass through line 106 and photo-electric relay E to both lines 117 and 118. Current passes through lines 118 and 103 and thence through the coil of relay S and back to the main return line 104 through line 119. This current closes relay S. Current passes through line 117 through the latch release coil W' of the latching relay and thence back to the main return line 104 through line 117'. Thus energized the latch release coil W' actuates and mechanically releases the armature of the pull-up coil W. If the armature is not already away from coil W it will now drop back and open switch 102 since pull-up coil W is not energized because switch 78 is being held in a position to open line 105 by the cam 69 on the crank of the cutter drive.

After the tubes in the rectifier system and in the photoelectric relay have warmed up, the apparatus is ready to start an engraving operation, it being assumed that the scanning system and the stroke of the crank of the cutter motor have been correspondingly adjusted for engraving a series of lines of the same length. Now the knob J of switch G is manually turned from the neutral position shown in Fig. 10 to the "automatic" position shown in Fig. 10A. This reverses the position of switch G1 and closes switch G2 (forming part of switch G) so that now current can pass through line 109, switch F2 of relay F, line 121 and switch S1 of relay S to the feed motor Mf which starts feeding the scale blank. The closing of switch G2 permits alternating current to flow through lines 110 and 111 to the plate transformer U so that the rectifier system starts supplying direct current which is supplied in the windings of the cutter driving motor Mc because the relay S is closed. When switch G is thus operated current to relay F through switch G1 is cut off. Relay F remains closed by virtue of the current flowing through lines 100, 114, overtravel switch 85, line 142, switch F1 of relay F, the coil of relay F and back to the main return line 104.

This condition will remain until the carriage has been fed by a sufficient amount to bring the first transparent line on the master scale into the light beam of the scanning system. Immediately that the leading edge of the first line on the master scale passes into the light beam, sufficient light will fall on the photo cell 70 to close the photo-electric relay E. This will cause de-energization of relay S so that the switches thereof will snap to the normal position shown in Fig. 10 and alternating current will be cut off from the feed motor Mf and will be applied to the cutter driving motor Mc. At the same time the direct current will be transferred from the windings of motor Mc to the windings of feed motor Mf to dynamically brake the carriage feeding mechanism. The opening of line 117 by relay E de-energizes the latch release coil W' allowing its armature to snap up into a latching position. As the cutter motor drives far enough to remove the cam 69 on crank 45 from switch 78 current is allowed to flow through line 100, switch 78, line 105, pull-up coil W and thence back to the main return line 104. Thus energized the pull-up coil W of the latch relay closes switch 102, and connects line 103 from relay coil S through switch 102 to line 101 and thence to switch 78. Since switch 78 is now open to line 101 relay S remains open. At the same time the latch on the armature of relay coil W' is free to drop back and lock the armature of relay coil W in the pulled-up position since relay coil W' is not energized.

The cutter motor Mc now continues to drive until the crank 45 has made one revolution and a line on each scale blank has been cut, then cam 69 on crank 45 restores switch 78 to the position shown in Fig. 10 and causes the relay S to be energized through line 100, switch 78, line 101, switch 102 of the latching relay, and line 103. Relay S transposes the power supplies on the motor Mf and Mc so that the feed motor is again energized by alternating current to drive, and the cutter motor is dynamically braked by direct current in its field windings despite the fact that the line on the master scale is still in the light beam. The switch 102 cannot open when pull-up coil W is de-energized because it was latched closed by the armature of latching coil W'. Just as soon as the carriage has been fed far enough to remove the previously used line on the master scale from the light beam, the photo-cell goes dark and the photo-electric relay E opens so that the relay S is again energized through line 118 while latch-release coil W' is energized through line 117 to release the armature of the pull-up coil W and allow switch 102 to open. The circuit is thus reset for a new engraving sequence when the next line on the master scale comes into position in the light beam of the scanning system, at which time the set-forth procedure is repeated.

When the last line on the master scale has been moved past the scanning beam, the feed motor Mf will continue to drive the carriage until the over-travel switch 85 is engaged and opened thereby. Actuation of switch 85 will de-energize relay F, stopping the feed motor, turning off the auto-transformer U of the rectifier system and turning out the exciter lamp 64. The carriage can then be manually returned to the starting point by means of crank 88 without actuating the photo-electric relay E, and with the feed motor Mf still dead. When ready to start the machine on a new set of lines, or on a new scale, the control knob J of switch G is returned to the neutral position for a moment and is then thrown back to the "automatic" or "run" position. It is necessary to return the knob J of switch G to its neutral position in order to again start the machine because this will initially energize the relay F starting the exciter lamp and preparing the circuits to feed power to the auto-transformer U of the rectifier system when knob J is again turned back to the "automatic" or "run" position. With the switch G in "automatic" position, the entire cycle of operation will be the same as before.

Figure 10B:
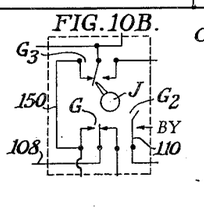
Fig. 10B is a detail similar to Fig. 10A but with the switch in its "manual" position.
Figure 11:
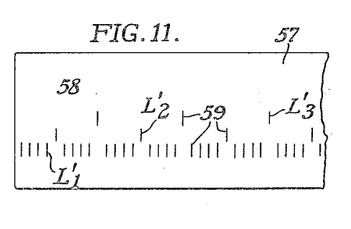
Fig. 11 is an enlarged partial plan view of the master scale used in conjunction with the apparatus.

If it is found desirable or necessary for setting up and testing purposes to feed the master scale along with the exciter lamp off, this can be done by turning the knob J of switch G clockwise from its neutral position to a "manual" position, see Fig. 10B. This will cause switch $G_3$ to be reversed so that current can pass through lines 100, 113, 150, 109, switch $F_2$ of relay F, line 121 and switch $S_1$ of relay S to the windings of the feed motor $M_f$. In case of power failure to this machine, relay F will open and the instrument will not start engraving again until the control knob J of switch G has been returned to the neutral position. The relay F also protects the rectifier tubes against receiving plate voltage immediately when the power comes on again. The instrument is quite foolproof if the tubes are allowed to warm up each time the power is turned on before the control knob J of switch G is manipulated.

To prevent any chance of the feed motor tending to advance the scale while the cutters are in any position other than a neutral position, the following safety feature has been added to the circuit. The conventional photo-electric relay E as supplied is provided with two contacts D and D' which when short circuited will cause the relay to be closed or energized despite the signal coming from the photo-cell 70. Accordingly, these contacts D and D' of the photo-electric relay are connected by lines 151 and 152 into a third switch $S_3$ of relay S so that they will be short-circuited when the relay S is opened or at all times that the cutter driving motor is driving. The only condition which we have encountered where the feed motor tends to drive while the cutters are still in a cutting position is where during the cutting stroke there is an obstruction encountered in the material of the blank by the cutter which sets up a wedging action tending to move the carriage along as the cutter is making its cutting stroke. If the longitudinal shift so caused is sufficient, the line on the master scale will be removed from the light beam and the photo-cell upon going dark will allow the photo-electric relay E to open, whereupon relay S will be energized to switch the alternating current supply from the cutter motor $M_c$ to the feed motor $M_f$. This condition is encountered very, very rarely.

Now that the motor circuit and its operation has been described, the method of focusing the optical part of the scanning system can be understood. To so focus the scanning system, the leads of a vacuum tube volt meter (such as the RCA Volt Ohmyst Jr.) are connected between line 120 and the ground terminal of the General Electric photo-electric relay panel. With the exciter lamp off (control knob J of switch G held in the manual position) the sensitivity control of the photo-electric relay panel is adjusted for a zero reading on the vacuum voltmeter. Switch G is then restored to the neutral position, and the shaft of the feed motor is rotated by hand until a line on the master scale comes beneath the scanning system. At this point, some indication will be obtained on the volt meter. The procedure consists of adjusting the focus of the optical system while moving the master scale back and forth by means of the feed motor shaft until the focus adjustment is found which will produce the maximum reading on the volt meter as a line on the master scale is moved through the beam of light.

After the scales have been cut on the scale blanks, and the carriage is returned to its starting position on the bed plate, a stamping roll mechanism geared to the rack 86 on the carriage is dropped down into embossing position relative to the scale blanks on the carriage, and then the carriage is manually fed along the bed by use of the crank 88 to roll the members onto the scale blanks. Referring to Figs. 2 and 3, this numbering mechanism includes a bearing block 90 fixed to the bed 11 by bolts 91 to one side of the carriage 19. Rotatably mounted in the bearing block 90 is a shaft 92 having bearing portions 93 engaging the bearing block and including bearing portions 94 extending beyond the block 90 and on which a spacer member 194 is rotatably mounted. Clamped in spaced relation on this spacer member 194 are a pair of steel number stamping rolls 95 and a gear ring 96, the parts being held in assembled relation on the spacer by the heads of a plurality of bolts 97. The gear ring 96 is in engagement with the rack 86 on the carriage at all times so that as the carriage is advanced the numbering rolls are rotated. The numbering rolls are initially positioned in such relation to the starting position of the carriage that the numbers will be stamped opposite the proper scale lines engraved on the blanks as the carriage is advanced.

There is a slight eccentricity between the bearing portions 93 and 94 of the shaft 92 so that by rotating the shaft relative to the bearing block 90 the stamping rolls can be moved between an embossing position and an inoperative position relative to the blanks mounted on the carriage. This eccentricity is less than the depth of the tooth engagement between gear ring 96 and the rack 86 so that even when the stamping rolls are raised to their inoperative positions they remain geared to the rack so that the index relation between the same and the scale lines cut in the blank will not be lost. For raising and lowering the stamping rolls, a knurled knob 98, which is keyed to the end of the shaft 92, is rotated between two positions indicated by two marks signifying "up" and "down" on the periphery of the knob which cooperate with a stationary pointer 98' fixed to the top of the bearing block. These marks on the knob 98 will preferably be 180 degrees apart so that only the one signifying "up" can be seen in Fig. 1. To facilitate adjustment of knob 98, a knurled clamping screw 99 threaded into the end of shaft 92 is first loosened, and after adjustment, this screw is again tightened to pull the knob 98 against the end of the bearing block 90 to lock the same adjusted position. The numbering rolls are preferably covered by a hood 99' to protect the same from physical damage.

It will thus be seen that when the scale has been completely engraved and is ready to be numbered the half-nut 21 is first raised by swinging lever 24 counter-clockwise and the table is moved to its starting position by means of crank 88. Then clamping screw 99 is loosened and knob 98 is turned until the mark "down" on its periphery is opposite the pointer 98'. This means that the stamping rolls have been dropped to their embossing position. Then clamping screw 99 is tightened and the carriage is fed along by means of crank 88 whereupon the numbering mechanism will be driven by engagement between the rack 86 and gear ring 96 so as to simultaneously roll the numbers into the two scale blanks 10 on the carriage.

While we prefer to emboss the numbers on the blanks after the engraving thereof has been entirely completed, it will be readily understood that the numbering mechanism could be dropped down at any time so that the numbers could be stamped on the scale blanks during any one of the trips of the carriage along the bed during the engraving operation of any one of the series of lines.

It is believed that from the above description it will be understood that we have provided a scale engraving machine which is automatic and substantially foolproof in operation. Despite the fact that no particular rigid tolerances are required on the mechanical parts of the apparatus, with the exception of the fabrication of the master scale, of course, we have found in commercial operation that exceedingly accurate results can be obtained in a substantially rapid manner. By use of the dynamic braking feature for the respective carriage and cutter drives it has been found that a maximum indexing error of .00007 inch is encounterable, and the indexing of this machine is found to be so good that no "spreading" of the scale lines could be detected when running the scale through the engraving operation a second time. The machine is capable of cutting a scale having any form of spacing between the lines, regular or irregular, and the "fineness" of the scale which can be engraved is limited only by the width of the scanning light beam used. We have found that two complete scales, about 8 inches long and including lines of three different lengths, can be engraved and numbered in about twenty-seven minutes. This means approximately nine minutes for each trip of the carriage through the machine during the automatic engraving operation.

Although we have shown and described certain specific embodiments of our invention, we are fully aware that many modifications thereof are possible. For example, the two motors could be direct-current motors of the shunt type connected to the power source in such a way that when switches $S_1$ and $S_2$ of relay S were in one position the current would flow through the field and armature of one motor in the normal way to drive the motor while the field of the other motor would remain energized and its armature would be short circuited, and this relationship would be reversed by energization of relay S. This short circuiting of the motor armatures would provide a dynamic braking action on the drives as in the arrangement described. Our invention, therefore, is not to be limited to the precise details and construction shown and described but is intended to cover all modifications coming within the scope of the appended claims.

Having thus described our invention, what we claim is new and desire to secure by Letters Patent of the United States is:

1. In a machine of the type described the combination of a movable work supporting table; means including an alternating current motor for feeding the table in one direction; a movable tool for acting upon the work carried by said table when it is stationary, means including an alternating-current motor for driving said tool; a source of alternating current; a source of direct current; means for simultaneously applying the alternating current to the windings of one of said motors to run the same and applying the direct current to the windings of the other motor to dynamically brake the drive connected thereto; and means for automatically reversing the current applications to said respective motors in response to given increments of travel of said table and/or tool.

2. A machine according to claim 1 in which the last mentioned means includes a relay; and a light sensitive cell controlling the operation of said relay.

3. A machine according to claim 1 in which the last mentioned means includes a relay; two separate energizing circuits for said relay, one associated with the feed of the table and the other associated with the travel of the tool; a light sensitive cell controlling one of said circuits; and a cam operated switch controlling the other of said circuits.

4. In an engraving machine of the type described the combination of a movable table on which a blank to be engraved with a given scale is mounted; means including an electric motor for feeding said table lengthwise of the scale; an engraving tool; means for moving said tool transversely of the blank to individually cut the scale lines therein when the blank is stationary; means including an electric motor for driving said tool through a cutting stroke; means for automatically alternately starting and stopping the table feeding motor to position said table relative to the path of said tool to give the desired spacing to the scale lines; and means for automatically alternately starting and stopping the tool driving motor to individually cut the scale lines; said last two means being inter-connected so that the tool driving motor starts after the table feeding motor stops and the blank is stationary and stops after making a single stroke and the table feeding motor starts as the tool driving motor stops.

5. An engraving machine according to claim 4 wherein said motors are alternating-current motors and which includes a source of direct current power as well as a source of alternating current power for driving the motors, and means for connecting the field windings of the motors to the direct current source the instant they are cut off of the alternating current source, whereby a magnetic brake is applied to the rotors of the motors to prevent the drive associated therewith from coasting.

6. An engraving machine according to claim 4 including a master scale fixed to the table in a given relation to the blank mounted thereon and movable therewith; and means for monitoring said master scale to indicate when the table has been fed sufficiently relative to the path of the tool to cut a line in the blank corresponding in location to one on the master scale; and means operated by said monitoring system for cutting alternating current from said table feeding motor and applying it to said tool driving motor.

7. An engraving machine according to claim 4 including a master scale fixed to the table in a given relation to the blank mounted thereon, said master scale comprising an opaque plate having a plurality of transparent lines spaced therealong and corresponding to the spacing between the lines desired on the scale; a scanning system for scanning said master scale, and including means for projecting a line of light onto said scale, and a light sensitive cell on the other side of said scale; and means actuated by said light cell for stopping and braking said table feed motor and starting said tool driving motor.

8. In a scale engraving machine the combination with a support; a movable table on which a blank to be engraved is adapted to be mounted; means for moving said table in a direction to feed said blank lengthwise and including an electric motor; a reciprocal engraving tool on said support; means for reciprocating said tool over a given path transversely of the direction of feed of said table to cut the individual lines in said blank; means for indexing the feed of said table to cut the individual lines of the scale with a prescribed distance between them; said means including a master scale fixed to the table to move therewith and including scale lines; a scanning system on said support in definite relation to the path of said tool and arranged to scan said master scale as it moves along; said system including a light source, means for projecting an image of said source onto said master scale, and a light sensitive cell on the opposite side of said scale with respect to said light source; an input circuit for said motor and light source including a manual switch movable between a "run" and a "rest" position; a relay in said circuit for connecting said motor to the input when energized; a control circuit for said relay, including said light cell which causes said relay to be de-energized when a scale on the master scale is in the scanning system; means operated by the completion of the engraving stroke of said tool for momentarily energizing said relay independent of said light cell control to cause the table to be fed sufficiently to remove the line on the master scale from the scanning system; and means actuated by the table reaching the end of its feed travel for automatically cutting the input off of said light source and motor until said manual switch is returned to its "rest" position and again moved to its "run" position, whereby said table can be rapidly returned to its start position without causing the control supervised by said scanning system to actuate.

9. An engraving machine according to claim 8, and including a second motor for driving said engraving tool; said relay adapted to control the connection of said second motor to the input and arranged so that when said relay is energized the second motor is cut off and when the relay is de-energized the second motor is connected to the input, and means for braking each of said motor drives the instant the current is cut off thereof to prevent the same from overtraveling beyond a selected position.

10. An engraving machine according to claim 8 in which said motor is an alternating-current motor and including a second alternating-current motor for driving said engraving tool; a direct-current power supply as well as an alternating-current power supply; said relay when energized adapted to connect the first motor with the alternating-current power supply and the second motor with the direct-current power supply and vice versa when it is de-energized, whereby one motor is automatically braked the instant the other starts running to prevent the blank from being fed while the tool is engraving a line and to eliminate overtravel of the motor driven parts beyond a selected position.

11. In a scale engraving machine for engraving a scale having lines of different length, the combination with a table on which a blank is adapted to be mounted; means for feeding said table in one direction to move said blank lengthwise; an engraving tool; means for reciprocating said tool over a given path transversely of said blank; means for automatically starting said table-feeding means to feed said table and stopping the same after it has operated sufficiently to feed the blank relative to said tool path by an amount equal to the spacing desired between any two lines on the scale; said last-mentioned means including a motor connected to said table; a switch for starting and stopping said motor; a master scale fixed on said table to move therewith, and including two separate groups of lines each corresponding to lines of a given length which are to be engraved on said blank; a scanning system including a light-sensitive cell for scanning said master scale with a light beam; and means actuated by a change in light on said cell due to passage of a line on said master scale beneath said scanning system for stopping said motor so that another line can be cut on the blank; and means for indexing said scanning system over said master scale from one group of lines to another, whereby all lines of a given length are engraved on the blank in one complete feeding operation of the table, and all lines of a different length are engraved in a subsequent complete feeding operation of the table.

12. In a scale engraving machine for engraving a scale having lines of different length, the combination with a table on which a blank is adapted to be mounted; means for feeding said table in one direction to move said blank lengthwise; an engraving tool; means for reciprocating said tool over a given path transversely of said blank; means for automatically starting said table-feeding means to feed said table and stopping the same after it has operated sufficiently to feed the blank relative to said tool path by an amount equal to the spacing desired between any two lines on the scale; said last-mentioned means including an alternating-current motor; a direct current source of power, as well as an alternating current source of power; a first motor circuit for connecting the alternating current source of power to the field winding of said motor for running the same; a second motor circuit for connecting the direct current source of power to the field winding of said motor to magnetically brake the same; a switch for starting and stopping said motor and arranged to connect the direct current source of power to the motor when it is moved to disconnect the alternating current source of power therefrom; a master scale fixed to said table to move therewith; a scanning system including a light-sensitive cell for scanning said master scale with a light beam; and means actuated by a change in light on said cell due to passage of a line on said master scale beneath said scanning system for stopping said motor so that another line can be cut on the blank.

13. In a scale engraving machine for engraving a scale having lines of different length, the combination with a table on which a blank is adapted to be mounted; means for feeding said table in one direction to move said blank lengthwise, and including a first motor; an engraving tool; means for reciprocating said tool over a given path transversely of said blank and including a second motor; means for automatically starting said table feeding means and stopping the same after it has operated sufficiently to feed the blank relative to said tool path by an amount equal to the spacing desired between any two lines on the scale, and including a switch for starting and stopping said first motor; a master scale fixed to said table to move therewith; a scanning system including a light-sensitive cell for scanning said master scale with a light beam; and means actuated by a change in light on said cell due to passage of a line on said master scale beneath said scanning system for stopping said motor so that another line can be cut on the blank; said switch arranged to stop and start said second motor in inverse relation to said first motor; and a second normally-opened switch adapted to be momentarily closed by a cam associated with the drive shaft of said tool for causing said first switch to be thrown to a position to start said table feed motor and stop said tool drive motor and to maintain this condition of control until the feed table is moved sufficiently to remove a line on the master scale from the scanning system.

14. In a scale engraving machine for engraving a scale having lines of different length, the combination with a table on which a blank is adapted to be mounted; means for feeding said table in one direction to move said blank lengthwise, and including a first motor; an engraving tool; means for reciprocating said tool over a given path transversely of said blank and including a second motor; a crank connected to said tool and driven by said motor; means for adjusting the throw of said crank to cut lines of different length on said blank; means for automatically starting said table feeding means and stopping the same after it has operated sufficiently to feed the blank relative to said tool path by an amount equal to the spacing desired between any two lines on the scale, and including a switch for starting and stopping said first motor; a master scale fixed to said table to move therewith; a scanning system including a light-sensitive cell for scanning said master scale with a light beam; and means actuated by a change in light on said cell due to passage of a line on said master scale beneath said scanning system for stopping said motor so that another line can be cut on the blank; said switch arranged to stop and start said second motor in inverse relation to said first motor.

CHARLES W. CLUTZ.
EARLE A. YOUNG.

REFERENCES CITED

The following references are of record in the file of this patent:

UNITED STATES PATENTS

| Number | Name | Date |
|---|---|---|
| 41,742 | Jones | Feb. 23, 1864 |
| 121,420 | Reynolds | Nov. 28, 1871 |
| 2,169,308 | Wagner et al | Aug. 15, 1939 |

Certificate of Correction

Patent No. 2,496,936                              February 7, 1950

CHARLES W. CLUTZ ET AL.

It is hereby certified that errors appear in the printed specification of the above numbered patent requiring correction as follows:

Column 11, line 62, for "lines 100, 114" read *lines 100, 113*; column 15, line 51, for the words "remain energized" read *be cut off*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*